US012780666B2

(12) United States Patent
Zuzak et al.

(10) Patent No.: US 12,780,666 B2
(45) Date of Patent: Nov. 3, 2026

(54) METHOD FOR PRODUCING GRAPHENE NANOSTRUCTURES

(71) Applicant: UNIWERSYTET JAGIELLONSKI, Cracow (PL)

(72) Inventors: Rafal Zuzak, Cracow (PL); Szymon Godlewski, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 65 days.

(21) Appl. No.: 18/855,341

(22) PCT Filed: Apr. 20, 2023

(86) PCT No.: PCT/EP2023/060258
§ 371 (c)(1),
(2) Date: Oct. 9, 2024

(87) PCT Pub. No.: WO2023/203125
PCT Pub. Date: Oct. 26, 2023

(65) Prior Publication Data

US 2025/0340438 A1 Nov. 6, 2025

(30) Foreign Application Priority Data

Apr. 20, 2022 (PL) ...................................... P.440982
Apr. 20, 2022 (PL) ...................................... P.440983

(51) Int. Cl.
*C01B 32/184* (2017.01)

(52) U.S. Cl.
CPC ........ *C01B 32/184* (2017.08); *C01P 2004/04* (2013.01); *C01P 2004/17* (2013.01)

(58) Field of Classification Search
CPC ............................ C01B 32/182; C01B 32/184
See application file for complete search history.

(56) References Cited

U.S. PATENT DOCUMENTS

| | | | | |
|---|---|---|---|---|
| 2014/0315023 | A1* | 10/2014 | Fasel | C01B 32/182 977/932 |
| 2015/0299847 | A1* | 10/2015 | Hirota | C23C 16/44 134/1.1 |
| 2022/0333234 | A1* | 10/2022 | Sinitskii | C23C 16/56 |

FOREIGN PATENT DOCUMENTS

PL 236198 B1 * 12/2020

OTHER PUBLICATIONS

International Search Report for PCT/EP2023/060258 Mailed On Sep. 22, 2023.

Jinming Cai et al: "Atomically precise bottom-up fabrication of graphene nanoribbons", NATURE, vol. 466, No. 7305, Jul. 22, 2010, pp. 470-473, XP055022095. ISSN: 0028-0836, DOI: 10.1038/nature09211 "Methods Summary".

Ruffieux Pascal et al: "On-surface synthesis of graphene nanoribbons with zigzag edge topology", Nature, Nature Publishing Group UK, London, vol. 531, No. 7595, Mar. 23, 2016, pp. 489-492, XP037442719, ISSN: 0028-0836, DOI: 10.1038/NATURE17151.

Carlos Sanchez et al: "On-Surface Hydrogen-Inducing Covalent Coupling of Polycyclic Aromatic Hydrocarbons via a Superhydrogenated Intermediate", Arxiv.Org, Cornell University Library, 201 Olin Library Cornell University Ithaca, NY, 14853, Apr. 26, 2019, XP081174217, DOI: 10.1021/JACS.8B12239.

Rafal Zuzak et al: "Building a 22-ring nanographene by combining in-solution and on-surface syntheses", Chemical Communications, vol. 54, No. 73, Aug. 17, 2018, pp. 10256-10259, XP055584762, UK, ISSN: 1359-7345, DOI: 10.1039/C8CC05353G.

Rafal Zuzak et al: "On-Surface Synthesis with Atomic Hydrogen", ACD NANO, vol. 14, No. 10, Oct. 27, 2020, pp. 13316-13323, XP93082142, US, ISSN: 1936-0851, DOI: 10.1021/acsnano.0c05160, URL: http://pubs.acs.org/doi/pdf/10.1021/acsnano.0c05160>.

Marek Kolmer et al: "Polymerization of Polyanthrylene on a Titanium Dioxide (011)—(2x1) Surface", Angewandte Chemie International Edition, Verlag Chemie, Hoboken, USA, vol. 52, No. 39, Aug. 12, 2013, pp. 10300-10303, XP072068929, ISSN: 1433-7851, DOI : 10.1002/ANIE.201303657.

Polish Search Report For P.440982 Mailed On Dec. 21, 2022.

Cameron Rogers et al.: "Closing the Nanographene Gap: Surface-Assisted Synthesis of Peripentacene from 6-6'-Bipentacene Precursors", Angewandte Chemie International Edition 2015, 7, 15143-1514.

Davide Curcio et al. "Molecular Lifting, Twisting, and Curling during Metal-Assisted Polycyclic Hydrocarbon Dehydrogenation", Journal of the American Chemical Society 2016, 138, 10, 3395-3402.

Jesus M. Fernandez-Garcia et al. "Π-Extended Corannulene-Based Nanographenes: Selective Formation of Negative Curvature", Journal of the American Chemical Society 2018, 140, 49, 17188-17196.

Polish Search Report For P.440983 Mailed On Dec. 23, 2022.

Rafal Zuzak et al. "On-Surface Synthesis of Chlorinated Narrow Graphene Nanoribbon Organometallic Hybrids", The Journal of Physical Chemistry Letter 2020, 11, 10290-10297.

(Continued)

*Primary Examiner* — Michael P Wieczorek
(74) *Attorney, Agent, or Firm* — Rivka Friedman

(57) ABSTRACT

A method for fabricating graphene nanoribbons by depositing molecules of a precursor directly on a surface of a substrate that is atomically pure, wherein the precursor is a polycyclic aromatic compound having halogen atoms; polymerizing the molecules of the precursor on the surface; and cyclodehydrogenating the polymerized structures under high vacuum conditions to obtain the graphene nanoribbons. A method for fabricating graphene nanoflakes by: depositing molecules of a precursor directly on a surface of a substrate, wherein the precursor is a polycyclic aromatic compound; and cyclodehydrogenating the precursor under high vacuum conditions to obtain the graphene nanoflakes.

11 Claims, 7 Drawing Sheets

(56) References Cited

OTHER PUBLICATIONS

Sebastian Thussing et al.: "Reaction Pathway toward Seven-Atom-Wide Armchair Graphene Nanoribbon Formation and Identification of Intermediate Species on Au(111)", The Journal of Physical Chemistry C 2020, 124, 29, 16009-16018.
Matthias Georg Schwab et al.: "Structurally Defined Graphene Nanoribbons with High Lateral Extension", Journal of the American Chemical Society 2012, 134, 44, 18169-18172.

* cited by examiner

METHOD FOR PRODUCING GRAPHENE NANOSTRUCTURES

TECHNICAL FIELD

The present invention relates to a method for producing graphene nanostructures, such as nanoribbons and nanoflakes, with the use of atomic hydrogen.

BACKGROUND

Graphene nanoribbons are structures of graphene having a shape of thin strips with a nanometre width (less than 100 nm). Unlike pure graphene, in such structures, a band gap is formed having a size which depends on the width of the ribbon. This is important for potential use of the nanoribbons in electronics. Depending on the doping or ribbon-edge type, the ribbons can also have magnetic properties, which may be applicable, e.g., in spintronics.

Since changing the width of a ribbon by a single carbon atom can change its physical properties very strongly, the problem was to find a suitable atomically precise method for fabrication of the ribbons. A milestone turned out to be the use of surface-based synthesis method—carried out on crystalline surfaces, under ultra-high vacuum. This allowed for fabricating the nanoribbons structures with atomic precision while imaging the structure and its properties with submolecular resolution (using Scanning Tunneling Microscopy (STM) and Atomic Force Microscopy (AFM)). The surface-based synthesis method is based on the use of molecular precursors synthesized using classical chemical methods. Typically, precursors are transformed into flat graphene nanostructures with a suitable topography in a two-step process which involves 1) a reaction of polymerisation, on the surface, and 2) a reaction of cyclodehydrogenation, which result in transforming the precursors into the flat graphene nanoribbons having proper topography. These reactions are known for the selected surfaces of noble metals, wherein the surface of gold (111) is mostly used. Such processes have been described in exemplary publications:

Cai, Jinming, et al. "Atomically precise bottom-up fabrication of graphene nanoribbons." Nature 466.7305 (2010): 470-473;

Ruffieux, Pascal, et al. "On-surface synthesis of graphene nanoribbons with zigzag edge topology." Nature 531.7595 (2016): 489-492;

As mentioned above, the process for fabricating the graphene nanoribbons consists of a step of polymerisation leading to the covalent bonding of the precursors, followed by flattening of the nano-structures to form graphene nanoribbons in a cyclodehydrogenation reaction. Crucially, the metallic substrate plays a catalytic role in both processes, and for this reason the known synthesis methods are limited to the surfaces of noble metals. This poses a difficulty in the way of practical use of nanoribbons.

In some cases, tedious complex processes of transferring nanoribbons from a metal surface to a selected non-metal surface have been used to produce prototype devices based on nanoribbons, as described in publications:

Bennett, Patrick B., et al. "Bottom-up graphene nanoribbon field-effect transistors." Applied Physics Letters 103.25 (2013): 253114;

Llinas, Juan Pablo, et al. "Short-channel field-effect transistors with 9-atom and 13-atom wide graphene nanoribbons." Nature communications 8.1 (2017): 1-6.

This approach has a number of drawbacks, an important one being, for example, the danger of generating, during the transfer process, a multitude of structural defects in ribbons synthesized on the metal surface. It is therefore a step backwards in terms of the possibility of precise synthesis of the structure. The search for a method that would enable direct synthesis of the nanoribbons on technologically more interesting semiconductor or insulating substrates, is still on. Examples of polymerisation reactions on non-metallic surfaces, however, are scarce. The known publications in this area are:

Sun, Kewei, Yuan Fang, and Lifeng Chi. "On-Surface Synthesis on Nonmetallic Substrates." ACS Materials Letters 3.1 (2020): 56-63;

Kolmer, Marek, et al. "Polymerization of Polyanthrylene on a Titanium Dioxide (011)-(2×1) Surface." Angewandte Chemie International Edition 52.39 (2013): 10300-10303;

Kolmer, Marek, et al. "On-surface polymerization on a semiconducting oxide: aryl halide coupling controlled by surface hydroxyl groups on rutile TiO2(011)." Chemical Communications 51.56 (2015): 11276-11279;

Richter, A., et al. "Diacetylene polymerization on a bulk insulator surface." Physical Chemistry Chemical Physics 19.23 (2017): 15172-15176;

Kittelmann, Markus, et al. "Sequential and site-specific on-surface synthesis on a bulk insulator." ACS nano 7.6 (2013): 5614-5620;

Para, Franck, et al. "Micrometre-long covalent organic fibres by photoinitiated chain-growth radical polymerization on an alkali-halide surface." Nature chemistry 10.11 (2018): 1112-1117;

Vasseur G., et al. "II Band Dispersion along Conjugated Organic Nanowires Synthesized on a Metal Oxide Semiconductor" Journal of the American Chemical Society 138.17 (2016) 5685-5692. g It is important to note that, despite some achievements in conducting polymerisation reactions, it has not yet been possible to carry out the cyclodehydrogenation reaction on a non-metallic surface to convert polymers into nanoribbons, on this type of surfaces. Recently, the synthesis of nanoribbons on the surface of titanium dioxide (011) using specially designed and synthesized precursors containing the appropriate spatial combination of hydrogen and fluorine atoms to induce the cyclodehydrodefluorogenation process and produce a graphene ribbon has been reported. Related publications are:

Kolmer, Marek, et al. "Fluorine-programmed nanozipping to tailored nanographenes on rutile TiO2 surfaces." Science 363.6422 (2019): 57-60;

Kolmer, Marek, et al. "Rational synthesis of atomically precise graphene nanoribbons directly on metal oxide surfaces." Science 369.6503 (2020): 571-575.

However, the above-mentioned method is far from universal, as firstly it requires the production of very specific and very difficult to synthesise precursors, and secondly it is limited to substrates on which the aforementioned cyclodehydrodefluorogenation reaction can be induced. Thirdly, the ribbon formation process requires a microscope tip for the initiation of the cyclodehydrogenation reaction for some rings, which makes the method not global, allowing only for forming individual ribbons.

A Polish patent PL236198 discloses a method for substituting halogen atoms with hydrogen atoms in halogen-substituted molecules of aromatic compounds; the method comprises the following steps: (a) halogen-substituted molecules of aromatic compounds (precursors) are applied onto a cleaned metal surface, in a vacuum reaction chamber; (b) atomic hydrogen is fed into the vacuum reaction chamber; (c) the molecule from step (a) undergoes the reaction of substitution of halogen atoms by hydrogen atoms, in the vacuum reaction chamber at 100° C., wherein steps (b) and (c) being performed simultaneously. The method further comprises step (d), in which cyclodehydrogenation is carried out by annealing the molecule obtained in step (c), at a temperature of 320° C. to 400° C. The method may find application in areas where there is a need to use aromatic compounds that cannot be stably obtained by traditional chemical synthesis methods, such as new types of graphene ribbons.

In turn, graphene nanoflakes, being nanometer-sized sections of graphene, have been attracting the attention of researchers over the past decade, mainly due to their ability to control physical and chemical properties at the atomic level, offering the prospect of application in future electronic devices.

Due to certain limitations (such as low solubility), synthesis of graphene nanoflakes poses many difficulties in classical solution chemistry.

In recent years, solutions have been developed for so-called surface synthesis under ultra-high vacuum (UHV) conditions—these enable nanographenes that cannot be produced with atomic precision in classical solution chemistry. Solutions in this area are described in exemplary scientific publications:

- Clairet al. "Controlling a chemical coupling reaction on a surface: tools and strategies for on-surface synthesis." Chemical reviews 119.7 (2019): 4717-4776;
- M. Treier. al. "Surface-assisted cyclodehydrogenation provides a synthetic route towards easily processable and chemically tailored nanographenes", Nat. Chem., 3, 61-67 (2011);
- Zuzak, Rafal, et al. "Building a 22-ring nanographene by combining in-solution and on-surface syntheses." Chemical Communications 54.73 (2018): 10256-10259.
- Zuzak, Rafal, et al. "Synthesis and reactivity of a trigonal porous nanographene on a gold surface." Chemical science 10.43 (2019): 10143-10148;
- Xu, Kun, et al. "On-surface synthesis of a nonplanar porous nanographene." Journal of the American Chemical Society 141.19 (2019): 7726-7730.

However, in the experiments described above, a key role is played by the metallic substrate (gold, copper or silver) that catalyses the intramolecular cyclisation of precursors on the surface, limiting the applicability of the approach to only the indicated metallic substrates.

From the point of view of the applied use of nanoflakes, a key issue is the development of methods that would enable atomically precise synthesis on the more technologically interesting semiconductor crystals, or insulators.

So far, processes leading to controlled synthesis on non-metallic surfaces have been very limited. This type of reaction is described, for example, in the publication Sun, Kewei, Yuan Fang, and Lifeng Chi. "On-Surface Synthesis on Nonmetallic Substrates." ACS Materials Letters 3.1 (2020): 56-63.

There are known methods enabling controlled cyclization on non-metallic surfaces. These methods include the use of specifically shaped precursors containing pairs of H and F atoms at appropriate positions, allowing the cyclodifluorination reaction to take place under specific conditions, as described in the following publications:

- Kolmer, Marek, et al. "Fluorine-programmed nanozipping to tailored nanographenes on rutile TiO2 surfaces." Science 363.6422 (2019): 57-60.
- Kolmer, Marek, et al. "Rational synthesis of atomically precise graphene nanoribbons directly on metal oxide surfaces." Science 369.6503 (2020): 571-575.

However, these methods only allow the fabrication of planar structures on certain substrates that provide adequate catalytic activity.

At present, there are not known solutions that would enable the use of previously produced hydrocarbon precursors, whose transformation by cyclodehydrogenation reaction would allow the efficient production of nanoflakes on the surface of non-metal crystals.

SUMMARY OF THE INVENTION

The present invention aims to provide an alternative method for producing graphene nanostructures, in particular nanoribbons and nanoflakes, that is devoid of the disadvantages discussed above.

In one aspect, the invention relates to a method for fabricating graphene nanoribbons, the method comprising the steps of: depositing molecules of a precursor directly on a surface of a substrate, wherein the surface is atomically pure and the precursor is a polycyclic aromatic compound having halogen atoms; carrying out a polymerization of the molecules of the precursor on the surface; and carrying out a cyclodehydrogenation of the polymerized structures under high vacuum conditions, with the pressure of molecular hydrogen in a cracker not exceeding $1\times10^{-7}$ mbar, at a temperature within the range of 200 to 220° C., whilst exposing the polymerized structures to atomic hydrogen, to obtain the graphene nanoribbons.

The depositing can be accomplished using a thermal-deposition technique.

The depositing can be performed on the substrate made of a non-metallic material.

The depositing can be performed on the substrate having the surface made of a semiconductor selected from the group consisting of titanium dioxide ($TiO_2$), silicon (Si), and germanium (Ge).

The depositing can be performed on the substrate having the surface made of an insulator selected from the group consisting of sodium chloride (NaCl) and silicon dioxide ($SiO_2$).

The method may comprise preparing the surface of the substrate by: (a) bombarding the surface of the substrate with argon ions ($Ar^+$); (b) heating the surface of the substrate by means of alternating current to a temperature above a room temperature; (c) cooling the surface of the substrate gradually to a room temperature; and (d) repeating steps (a) to (c) until the surface is atomically pure.

The cyclodehydrogenation can be carried for a time from 20 to 120 min.

According to the invention, the role of a metallic catalyst is taken over by atomic hydrogen dosed from an external source (a hydrogen cracker can be arranged as a source of the atomic hydrogen). This enables one to induce a cyclodehydrogenation process on non-metallic surfaces. The exemplary embodiments presented herein demonstrate the feasibility of producing graphene nanoribbons on titanium dioxide surfaces, from commercially available precursors. The exemplary embodiments presented herein presents the method according to the invention on the surface of titanium dioxide and for a specific precursor (DBBA), but the present invention can also be applied, by analogy, to other precursors, on another substrates, for example on semiconductor surfaces (e.g. surfaces of titanium dioxide of another than (011) crystal structure, surfaces of silicon, surfaces of germanium) or on insulating surfaces (e.g. KCl). Particularly, all the precursors that are currently known from using them on metallic surfaces—with carrying out the cyclodehydrogenation reaction, are suitable to be used with non-metallic substrates according to the method of the present invention.

The method of the present invention involve initiating the cyclodehydrogenation with atomic hydrogen providing planarization of polymer structures on non-metallic substrates, at 200-220° C., which was not previously possible in the prior-art solutions.

By the method according to the invention, various graphene nanoribbons can be produced, for example the ribbons having a width of 7 (7-AGNR), as well as the ribbons having a width of 9, 13, 5.

In another aspect, the invention relates to a method for fabricating graphene nanoflakes, the method comprising the steps of: depositing molecules of a precursor directly on a surface of a substrate, wherein the precursor is a polycyclic aromatic compound; carrying out a cyclodehydrogenation of precursors under high vacuum conditions, with a pressure of atomic hydrogen not exceeding $1\times10^{-7}$ mbar, at a temperature within the range of 200 to 220° C., whilst exposing the precursors to atomic hydrogen, to obtain the graphene nanoflakes.

The precursor can be a polycyclic aromatic compound containing hydrogen and carbon atoms.

The substrate can be non-metallic.

The substrate can be a semiconductor surface, in particular titanium oxide, silicon or germanium.

The substrate can be an insulator surface, in particular NaCl or $SiO_2$.

The method may comprise carrying out the cyclohydrogenation process for a time from 20 to 120 min.

The presented process uses a source of atomic hydrogen as a catalyst for the cyclohydrogenation reaction on the surface. With this arrangement, the proposed method is independent of the surface on which the reaction is carried out. The atomic hydrogen is obtained in a so-called hydrogen cracker, wherein ultra-pure molecular hydrogen (>99.99% H2) is thermally broken down on a tungsten cathode (the cathode temperature is about 2500° C.) into an atomic form. During exposure to the atomic hydrogen, the sample is heated to a temperature in the range of 200-220° C., which provides optimal conditions for the cyclodehydrogenation process. The exposure time is approximately 30 minutes.

The solution according to the invention, in which the role of the catalyst is taken over by atomic hydrogen dosed under ultra-high vacuum conditions, solves at least some of the prior art problems and enables the synthesis of nanoflakes on non-metallic substrates using a wide range of precursors. The specific implementation examples presented below show the application of the solution according to the invention for a specific precursor on a titanium dioxide surface (110), (011), insulating NaCl bulk crystal, insulating thin film (NaCl on Cu(111)), as well as $SiO_2$/Si (several hundred nanometer thick insulating $SiO_2$ layer on Si), but the solution can be analogously applied also for other precursors (for example, hexaphenylbenzene, 9,9'-biantracene) on other substrates,, e.g. KCl, graphene surface or $MoS_2$ surface.

Further aspects and features of the present invention are described in following description of the drawings.

BRIEF DESCRIPTION OF DRAWINGS

Aspects and features of the present invention will become apparent by describing, in detail, exemplary embodiments of the present invention with reference to the attached drawings, in which.

DETAILED DESCRIPTION OF EMBODIMENTS

Figure 1:
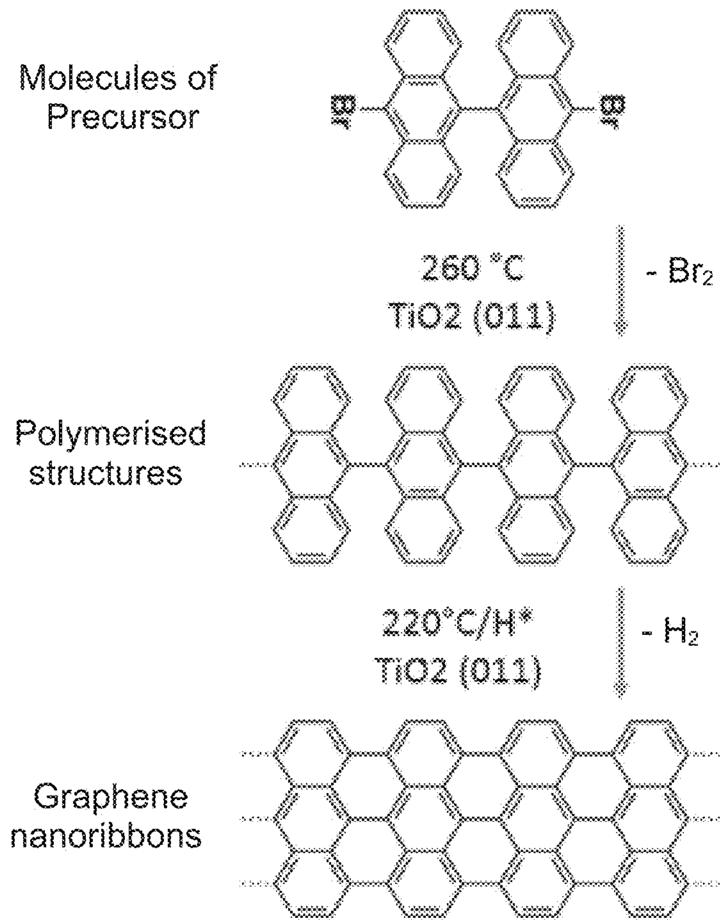
FIG. 1 shows schematically structures related to production of nanoribbons.

Reference will now be made to embodiments, examples of which are illustrated in the accompanying drawings. Aspects and features of the embodiments will be described with reference to the accompanying drawings. In the drawings, like reference numerals denote like elements. The present invention, however, may be embodied in various forms and should not be construed as being limited only to the illustrated embodiments. Rather, these embodiments are provided as examples so that this disclosure will be thorough and complete, and will fully convey the aspects and features of the present invention to those skilled in the art. It shall be understood that not all of the features shown in the embodiments are essential and the scope of the protection is defined not by means of literally shown embodiments, but by the features provided in the claims.

First Example—Production of Graphene Nanoribbons

The graphene nanoribbons were prepared using 10,10'-dibromo-9,9'-biantracene (DBBA) (Sigma Aldrich 808245) as the precursor having the structure shown in FIG. 1. (The same precursor is known from its use in fabrication of 7-AGNR graphene nanostructures by thermally induced cyclodehydrogenation on a metallic Au (111) surface, as described in Cai, Jinming, et al. "Atomically precise bottom-up fabrication of graphene nanoribbons, cited above." Nature 466.7305 (2010): 470-473).

The following technical devices were used to carry out the method: an ultra-high vacuum chamber with a base vacuum of approximately $1\cdot10^{-10}$ mbar together with a resistive heater and a hydrogen cracker of the type as described in Tschersich, K. G., J. P. Fleischhauer, and H. Schuler. "Design and characterization of a thermal hydrogen atom source." Journal of applied physics 104.3 (2008): 034908. In this type of cracker, molecular hydrogen ($H_2$) is thermally split into atomic hydrogen on a tungsten cathode whose temperature during operation is about 2500° C.

A substrate made of semiconductor i.e. pure $TiO_2$ crystal (011) was prepared according to known annealing procedures. Preparation of the surface of $TiO_2$ (011) substrate, under UHV conditions, was carried out as follows:

- at first step, the surface of $TiO_2$ (011) substrate was subjected to bombardment with argon ions ($Ar^+$) using an ion gun; the argon pressure in the ion gun was set at $5\times10^{-7}$ mbar, the bombardment time was 10 min;
- next, the $TiO_2$ crystal (011) was heated with alternating current to a temperature of about 770° C. for 10 min; the temperature was measured with a pyrometer;
- and at the final step, the $TiO_2$ crystal (011) was slowly cooled (for approx. 30 min.) to room temperature; a low-temperature STM microscope was used to check the surface quality of the substrate; the process as described above (bombarding, heating, cooling), was repeated until the surface of atomically pure crystal ($TiO_2$(011)) was obtained.

Next, onto the atomically pure crystal surface of $TiO_2$ (011) substrate the precursor (DBBA) molecules were thermally deposited. This was followed by thermally induced polymerization process which was carried out as follows: the surface of the substrate having deposited thereon the molecules of the precursor (DBBA) was heated to 260° C. for 15 min. The polymerization process occurred in said conditions resulted in polymerized structures (shown in FIG. 1). The details of how the polymerization process can be carried out are known to specialists, e.g., from the publication by Sun, Kewei, Yuan Fang, and Lifeng Chi "On-Surface Synthesis on Nonmetallic Substrates" ACS Materials Letters 3.1 (2020): 56-63 and Kolmer, Marek, et al. "Polymerization of Polyanthrylene on a Titanium Dioxide (011)-(2x1) Surface." Angewandte Chemie International Edition 52.39 (2013): 10300-10303.

Subsequently, the polymerized structures present on the surface of the substrate were subjected to dehydrogenation (and speaking more specifically, cyclodehydrogenation) resulting in flattening of the polymerized structures due to formation of new (additional) carbon-to-carbon bonds between the adjacent polycyclic aromatic structures. Therefore, as a result of the cyclodehydrogenation, the graphene nanoribbons were obtained.

The cyclodehydrogenation was induced with atomic hydrogen of the following parameters:

- atomic hydrogen was obtained by splitting molecular hydrogen (99.99% $H_2$) in a hydrogen cracker; the cracker was positioned so that its output was facing a sample with the polymerized structures, wherein the distance between the cracker output and the polymerized structures was set at approximately 10 cm;
- sample temperature during the process: 200-220° C. (the temperature was chosen experimentally to achieve essentially complete conversion of the polymers into graphene nanoribbons);
- the molecular hydrogen stream was directed toward the sample with the polymerized structures for 30 minutes (optimum time of treatment with the molecular hydrogen stream, selected experimentally);
- partial pressure of the molecular hydrogen introduced into the cracker system: $1\cdot10^{-7}$ mbar;
- experimentally determined efficiency of molecular-to-atomic-hydrogen splitting was approximately 10%.

Figure 2:
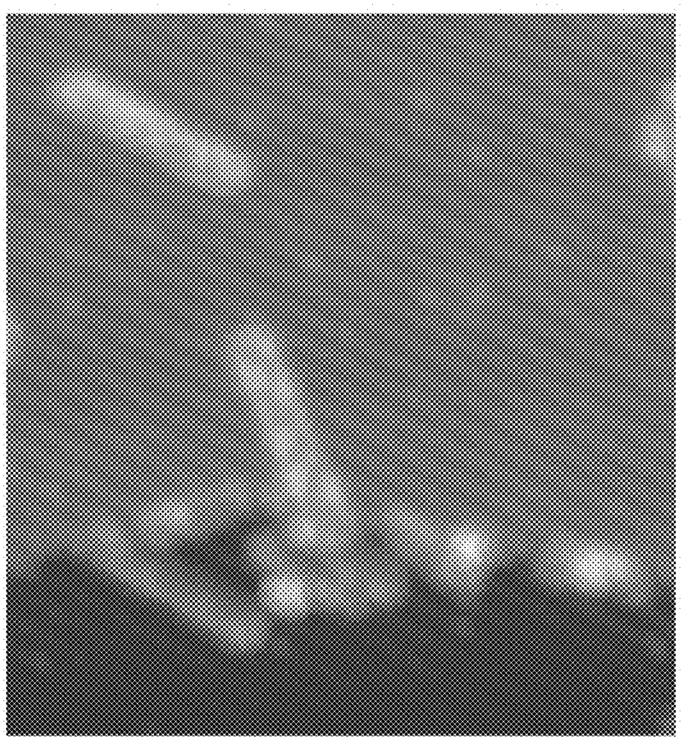
FIG. 2 shows nanoribbons produced on a surface of the $TiO_2$ crystal (011) according to a first example.

The course of the cyclodehydrogenation reaction was verified in a low-temperature STM microscope—images of the resulting 7 (7-AGNR) nanoribbons on the substrate having atomically pure crystal surface of $TiO_2$ (011), are shown in FIG. 2. The obtained nanoribbons were the same as those described in the paper: Cai, Jinming, et al. "Atomically precise bottom-up fabrication of graphene nanoribbons." Nature 466.7305 (2010): 470-473

Second Example—Production of Graphene Nanoflakes, $TiO_2$ (110) Substrate

Figure 3:
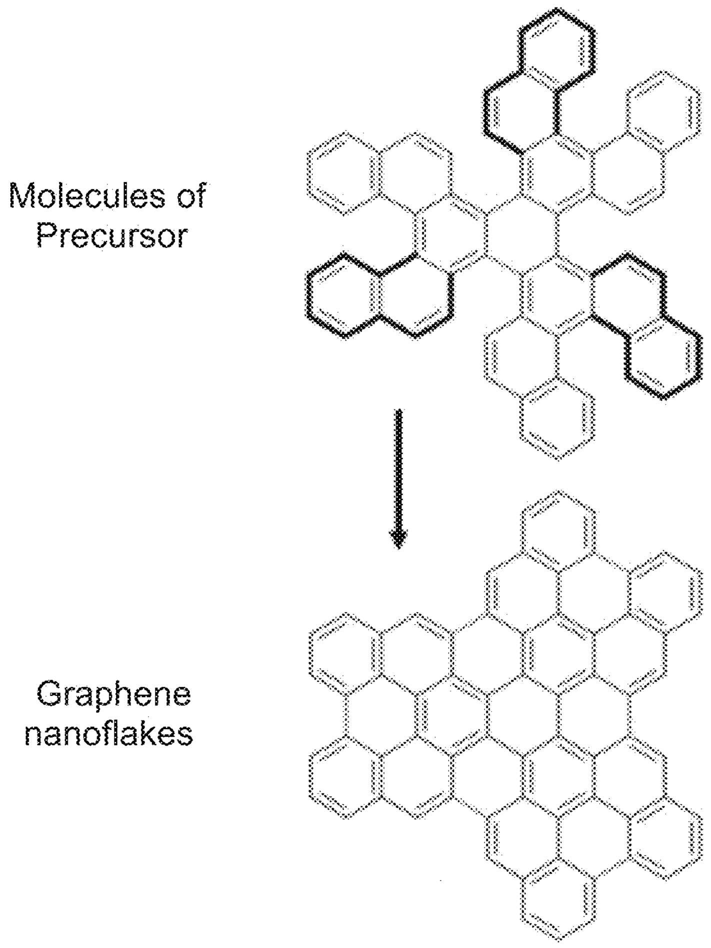
FIG. 3 shows schematically structures related to production of nanoflakes.

The graphene nanoflakes were prepared using a precursor shown in FIG. 3, wherein the precursor is shown in the top part and the nanoflake after the cyclodehydrogenation is shown in the bottom part. The same precursor is known from its use in fabrication of graphene nanoflakes by thermally induced cyclodehydrogenation on a metallic Au (111) surface, as described in R. Zuzak et al. Chemical Communication 2018.

The following technical devices were used to carry out the method: an ultra-high vacuum chamber with a base vacuum of approximately $1\cdot10^{-10}$ mbar together with a resistive heater and a hydrogen cracker of the type as described in Tschersich, K. G., J. P. Fleischhauer, and H. Schuler. "Design and characterization of a thermal hydrogen atom source." Journal of applied physics 104.3 (2008): 034908. In this type of cracker, ultrapure molecular hydrogen (99.99% $H_2$) is thermally split into atomic hydrogen on a tungsten cathode whose temperature during operation is about 2500° C.

A substrate made of pure $TiO_2$ (110) was prepared according to known surface cleaning procedures. Preparation of the surface of $TiO_2$ (110) substrate, under UHV conditions, was carried out as follows:

- at first step, the surface of $TiO_2$ (110) substrate was subjected to bombardment with argon ions ($Ar^+$) using an ion gun; the argon pressure in the ion gun was set at $5\times10^{-7}$ mbar, the bombardment time was 10 min;
- next, the $TiO_2$ crystal (110) was heated with alternating current to a temperature of about 770° C. for 10 min; the temperature was measured with a pyrometer;
- and at the final step, the $TiO_2$ crystal (110) was slowly cooled (for approx. 30 min.) to room temperature; a low-temperature STM microscope was used to check the surface quality of the substrate; the process as described above (bombarding, heating, cooling), was repeated until the surface of atomically pure crystal ($TiO_2$ (110)) was obtained.

Subsequently, the molecular precursors present on the surface of the substrate were subjected to dehydrogenation (and speaking more specifically, cyclodehydrogenation) with the following parameters:

- sample temperature during the process: 200-220° C. (the temperature was chosen experimentally to achieve essentially complete conversion of the precursor to nanographene);
- the time of carrying out the procedure was selected to 30 minutes (time of treatment necessary to achieve substantially complete conversion of the precursor to the nanographene, selected experimentally);
- partial pressure of the molecular hydrogen introduced into the cracker system: $1\cdot10^{-7}$ mbar;
- experimentally estimated efficiency of molecular-to-atomic-hydrogen splitting was 10%.

Figure 4:
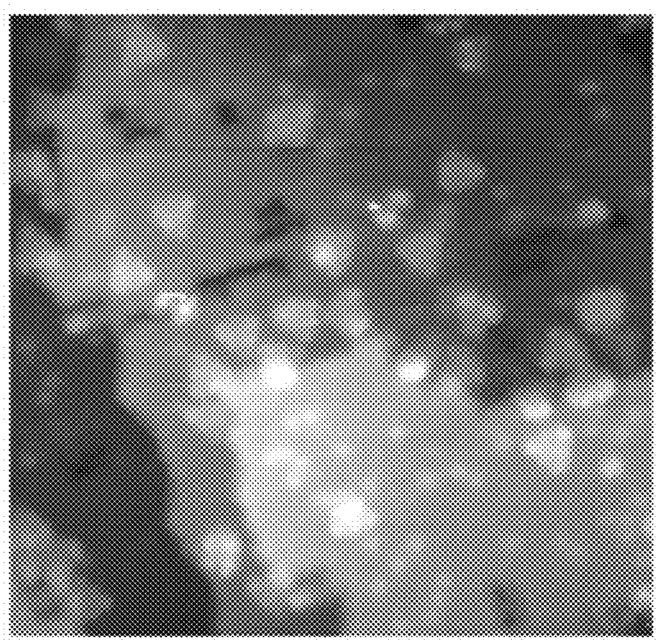
FIG. 4 shows nanoflakes produced on the $TiO_2$(110) substrate according to a second example.

The course of the cyclodehydrogenation reaction was verified in a low-temperature STM microscope—images of the obtained nanoflakes on the substrate having atomically pure crystal surface of $TiO_2$ (110), are shown in FIG. 4.

Third Example—Production of Graphene Nanoflakes, $TiO_2$ (011) Substrate

The third example was carried out in a manner similar to the second example, except that a $TiO_2$(011) substrate was used.

A substrate made of clean $TiO_2$ (011) was prepared according to known surface cleaning procedures. Preparation of the surface of $TiO_2$ (011) substrate, under UHV conditions, was carried out as follows:

- at first step, the surface of $TiO_2$ (011) substrate was subjected to bombardment with argon ions ($Ar^+$) using an ion gun; the argon pressure in the ion gun was set at $5\times10^{-7}$ mbar, the bombardment time was 10 min;
- next, the $TiO_2$ crystal (011) was heated with alternating current to a temperature of about 770° C. for 10 min; the temperature was measured with a pyrometer;
- and at the final step, the $TiO_2$ crystal (011) was slowly cooled (for approx. 30 min.) to room temperature; a low-temperature STM microscope was used to check the surface quality of the substrate; the process as described above (bombarding, heating, cooling), was repeated until the surface of atomically pure crystal ($TiO_2$(011)) was obtained.

Subsequently, the molecular precursors present on the surface of the substrate were subjected to dehydrogenation (and speaking more specifically, cyclodehydrogenation) with the following parameters:

- sample temperature during the process: 200-220° C. (the temperature was chosen experimentally to achieve essentially complete conversion of the precursor to nanographene);
- the time of carrying out the procedure was selected to 30 minutes (time of treatment necessary to achieve substantially complete conversion of the precursor to the nanographene, selected experimentally);
- partial pressure of the molecular hydrogen introduced into the cracker system: $1\cdot10^{-7}$ mbar;
- experimentally estimated efficiency of molecular-to-atomic-hydrogen splitting was 10%.

Figure 5:
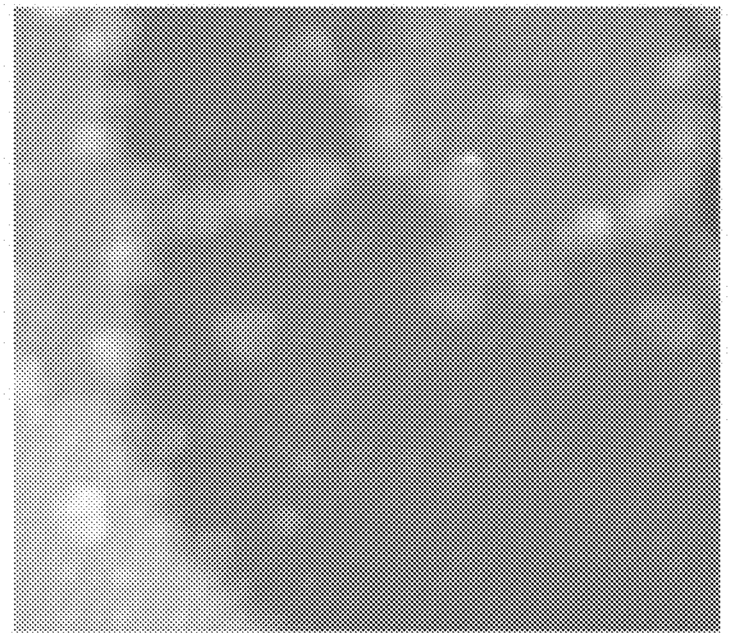
FIG. 5 shows nanoflakes produced on the $TiO_2$(011) substrate according to a third example.

Images of the resulting nanoflakes on the $TiO_2$(011) substrate are shown in FIG. 5. Since the obtained flakes are identical to those of the second example, this demonstrates that the method can be successfully applied to a variety of surfaces.

Fourth Example—Production of Graphene Nanoflakes, $SiO_2$/Si Interface

In this example, the substrate was made of a silicon bulk crystal covered by a layer of silicon oxide (300 nm thick) purchased from PI-KEM. This is a typical wafer that is used, for instance, in electronics industry. The oxide layer is an insulator, while the silicon bulk crystal is a semiconductor.

At first the molecular precursors were thermally evaporated onto the substrate. Subsequently, the molecular precursors present on the surface of the substrate were subjected to dehydrogenation (and speaking more specifically, cyclodehydrogenation) with the following parameters:

- sample temperature during the process: 200-220° C. (the temperature was chosen experimentally to achieve essentially complete conversion of the precursor to nanographene);
- the time of carrying out the procedure was selected to 30 minutes (time of treatment necessary to achieve substantially complete conversion of the precursor to the nanographene, selected experimentally);
- partial pressure of the molecular hydrogen introduced into the cracker system: $1\cdot10^{-7}$ mbar;
- experimentally estimated efficiency of molecular-to-atomic-hydrogen splitting was 10%.

Figure 6:
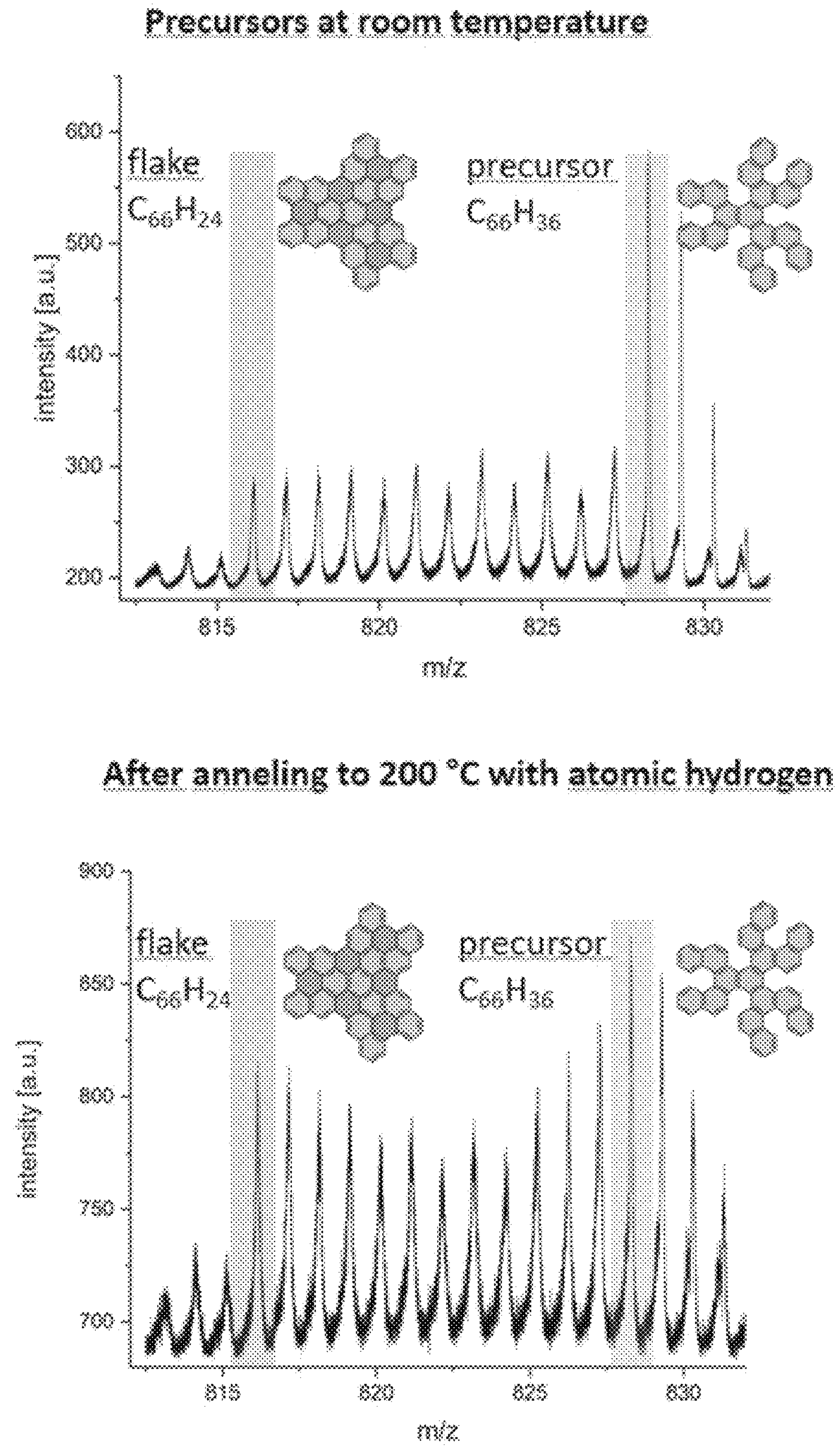
FIG. 6 shows spectra registered for nanoflakes produced on the $SiO_2$/Si sample in a fourth example.

Since the used sample surface is non-conductive (insulating oxide layer), in this case measurements were carried out using TOF-SIMS (time of flight—secondary ion mass spectroscopy, as described for example at bups://sere.carletods/ToFSIMS.html). The spectra recorded for the sample are shown in FIG. 6. The nanographene flake obtained after successful dehydrogenation process are characterized by a mass of 816 m/z, while the molecular precursor by 828 m/z. TOF-SIMS measurements prove successful generation of $C_{66}H_{24}$ nanographenes by application of the atomic hydrogen at 200° C. on the $SiO_2$/Si substrate.

The TOF-SIMS results for the generation of $C_{66}H_{24}$ nanographenes on the $SiO_2$/Si interface by atomic hydrogen treatment are shown in FIG. 6. The lower panel shows the results after formation of nanographenes, i.e. both precursors and nanographenes are present on the surface; the upper panel shows data before treatment with atomic hydrogen—only precursors are present on the surface.

Fifth Example—Production of Graphene Nanoflakes, NaCl (001) Substrate

The crystal was cleaved and subsequently annealed at 300° C. to generate a fresh surface. Further the molecular precursors were thermally evaporated onto the substrate. Subsequently, the molecular precursors present on the surface of the substrate were subjected to dehydrogenation (and speaking more specifically, cyclodehydrogenation) with the following parameters:

- sample temperature during the process: 200° C. (the temperature was chosen experimentally to balance between the conversion rate from precursors into nanoflakes and the desorption from the substrate);
- the time of carrying out the procedure was selected to 30 minutes (time of treatment necessary to achieve substantially complete conversion of the precursor to the nanographene, selected experimentally);
- partial pressure of the molecular hydrogen introduced into the cracker system: $1\cdot10^{-7}$ mbar;
- experimentally estimated efficiency of molecular-to-atomic-hydrogen splitting was 10%.

Figure 7:
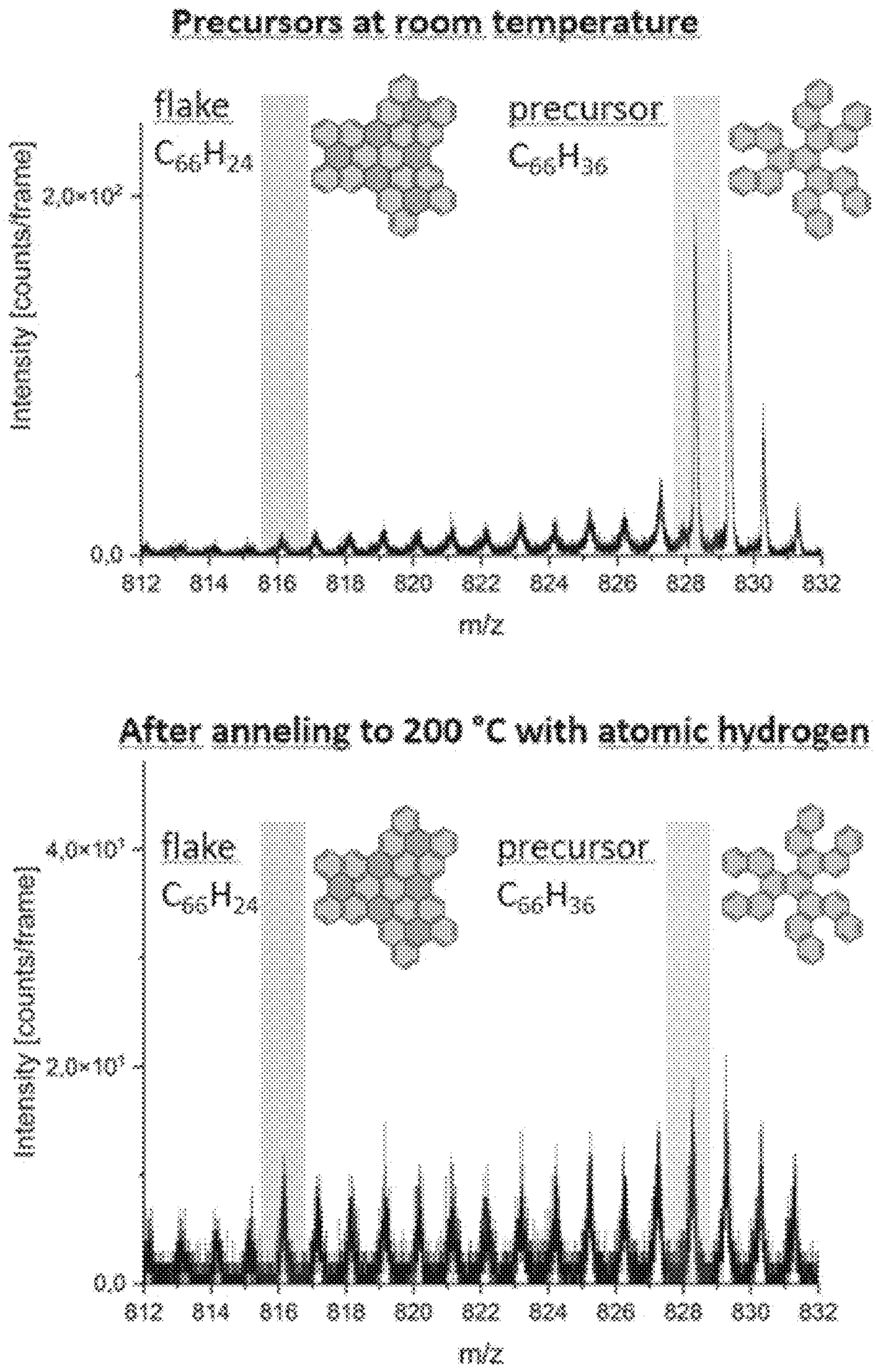
FIG. 7 shows spectra registered for nanoflakes produced on the bulk NaCl sample in a fifth example.

The cyclodehydrogenation was inspected using TOF-SIMS technique. The result is shown in FIG. 7. $C_{66}H_{24}$ nanographene synthesis was achieved here in a similar manner as for $SiO_2$/Si. In general, the yield of the achieved transformation is lower compared to the $SiO_2$/Si substrate because the cyclodehydrogenation proceeds in the same temperature range as the desorption of precursors from the substarte. This is because of the lower adsorption energy compared to $SiO_2$/Si. Consequently, a large fraction of precursors desorbs from the surface limiting the transformation efficiency. Nevertheless, the TOF-SIMS measurements (FIG. 7, upper panel) doubtlessly prove formation of $C_{66}H_{24}$ nanoflakes on bulk NaCl.

Sixth Example—Production of Graphene Nanoflakes, NaCl/Cu(111) Substrate

Following the method described in the literature, a thin layer of salt was prepared on the top of copper (111) surface (Mishima, Ryota, Masaki Takada, and Hirokazu Tada. "STM studies of NaCl thin films on Cu (111) surface at low temperature." Molecular Crystals and Liquid Crystals 472.1 (2007): 321-711). Further the molecular precursors were thermally evaporated onto the substrate. Subsequently, the molecular precursors present on the surface of the substrate were subjected to dehydrogenation (and speaking more specifically, cyclodehydrogenation) with the following parameters:

sample temperature during the process: 200-220° C. (the temperature was chosen experimentally to achieve essentially complete conversion of the precursor to nanographene);

the time of carrying out the procedure was selected to 30 minutes (time of treatment necessary to achieve substantially complete conversion of the precursor to the nanographene, selected experimentally);

partial pressure of the molecular hydrogen introduced into the cracker system: $1 \cdot 10^{-7}$ mbar;

experimentally estimated efficiency of molecular-to-atomic-hydrogen splitting was 10%.

Figure 8:
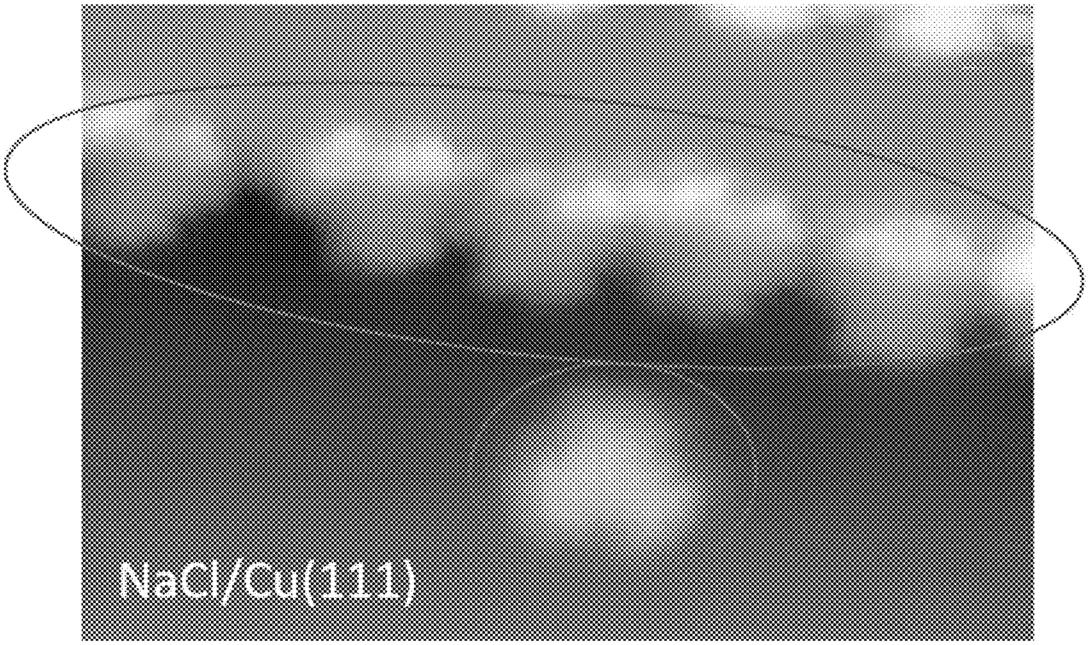
FIG. 8 shows STM imaging related to nanoflakes produced on the thin NaCl layer on Cu(111) in a sixth example.

By the application of the atomic hydrogen at 200-220° C. the $C_{66}H_{24}$ nanographenes were generated from molecular precursors on NaCl/Cu(111). Successful synthesis has been doubtlessly verified by the high resolution STM imaging shown in FIG. 8. The ovals mark $C_{66}H_{24}$ graphene nanoflakes immobilized at the surface steps.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A method for fabricating graphene nanoribbons, the method comprising:

depositing molecules of a precursor directly on an atomically pure surface of a titanium dioxide substrate, wherein the precursor is a polycyclic aromatic compound having halogen atoms;

polymerizing the molecules of the precursor on the surface to form polymerized precursor structures; and cyclodehydrogenating the polymerized precursor structures on the surface at a temperature within the range of 200 to 220° C. while exposing the polymerized precursor structures to atomic hydrogen, to obtain the graphene nanoribbons.

2. The method according to claim 1, wherein the depositing is accomplished using a thermal-deposition technique.

3. The method according to claim 1, wherein the surface is a $TiO_2(011)$ surface.

4. The method according to claim 1, comprising preparing the surface of the titanium dioxide substrate by:

a) bombarding the surface with argon ions at an argon pressure of about $5 \times 10^{-7}$ mbar for about 10 minutes;

b) heating the titanium dioxide substrate with alternating current to about 770° C. for about 10 minutes;

c) cooling the titanium dioxide substrate to room temperature over about 30 minutes; and d) repeating steps a) to c) until the surface is atomically pure.

5. The method according to claim 1, comprising cyclodehydrogenating for about 30 minutes.

6. The method according to claim 1, wherein the atomic hydrogen is generated in a hydrogen cracker from molecular hydrogen introduced into the hydrogen cracker at a partial pressure of about $1 \times 10^{-7}$ mbar.

7. A method for fabricating graphene nanoflakes, the method comprising:

depositing molecules of a precursor directly on a surface of a non-metallic substrate, wherein the precursor is a polycyclic aromatic compound; and cyclodehydrogenating the deposited precursor molecules on the surface at a temperature within the range of 200 to 220° C. while exposing the deposited precursor molecules to atomic hydrogen generated in a hydrogen cracker from molecular hydrogen introduced into the hydrogen cracker at a partial pressure of about $1 \times 10^{-7}$ mbar, to obtain the graphene nanoflakes.

8. The method according to claim 7, wherein the precursor is a polycyclic aromatic hydrocarbon containing hydrogen and carbon atoms.

9. The method according to claim 7, wherein the substrate is a titanium dioxide surface selected from $TiO_2(110)$ and $TiO_2(011)$.

10. The method according to claim 7, wherein the substrate is an insulator surface selected from sodium chloride (NaCl) and silicon dioxide ($SiO_2$).

11. The method according to claim 7, comprising cyclodehydrogenating for about 30 minutes.

* * * * *